(12) United States Patent
Maris (10) Patent No.: US 8,325,065 B2
(45) Date of Patent: Dec. 4, 2012

(54) SELF-ORIENTING SIGHTING RETICLE FOR VEHICLE AIMING EQUIPMENT

(75) Inventor: John M. Maris, St-Bruno-de-Montarville (CA)

(73) Assignee: Marinvent Corporation, St-Bruno de Montarville (CA)

( * ) Notice: Subject to any disclaimer, the term of this patent is extended or adjusted under 35 U.S.C. 154(b) by 609 days.

(21) Appl. No.: 12/594,498

(22) PCT Filed: Apr. 9, 2008

(86) PCT No.: PCT/CA2008/000668
§ 371 (c)(1),
(2), (4) Date: Oct. 2, 2009

(87) PCT Pub. No.: WO2008/122129
PCT Pub. Date: Oct. 16, 2008

(65) Prior Publication Data
US 2010/0117870 A1    May 13, 2010

Related U.S. Application Data

(60) Provisional application No. 60/910,806, filed on Apr. 9, 2007.

(51) Int. Cl.
*G08G 1/123* (2006.01)
(52) U.S. Cl. ............ 340/995.28; 340/971; 340/905
(58) Field of Classification Search ........... 340/995.28, 340/995.13, 905, 959, 971, 973, 982, 980, 340/981
See application file for complete search history.

(56) References Cited

U.S. PATENT DOCUMENTS

| | | | | |
|---|---|---|---|---|
| 4,173,414 A | * | 11/1979 | Vauchy et al. | 356/139.08 |
| 4,534,735 A | * | 8/1985 | Allard et al. | 434/20 |
| 5,822,713 A | * | 10/1998 | Profeta | 701/302 |

FOREIGN PATENT DOCUMENTS

| | | |
|---|---|---|
| CA | 2110307 | 6/1994 |
| CA | 2280647 | 2/2000 |

OTHER PUBLICATIONS

International Search Report, International application No. PCT/CA2008/000668, dated Jul. 24, 2008.

* cited by examiner

*Primary Examiner* — Daniel Previl
(74) *Attorney, Agent, or Firm* — Norton Rose Canada LLP (57) ABSTRACT

A method and a system for providing a sighting reticle oriented to aim at a target from a vehicle within an environment of the target are described. The method improves the situational awareness of the operator regardless of the orientation and motion of the aiming instrument. The method comprises providing a graphical image representing the environment seen from the vehicle when aiming at the target; determining a state of the vehicle with respect to a spatial reference point; overlaying the sighting reticle onto the graphical image, the sighting reticle indicating the target on the graphical image with respect to the spatial reference point, the sighting reticle comprising a marking defining the spatial reference point; positioning the sighting reticle to orient the marking based on the state of the vehicle; and displaying on a display device the sighting reticle positioned on the graphical image to enable aiming at the target.

21 Claims, 6 Drawing Sheets

SELF-ORIENTING SIGHTING RETICLE FOR VEHICLE AIMING EQUIPMENT

CROSS-REFERENCE TO RELATED APPLICATIONS

This application claims priority of U.S. Provisional Patent Application No. 60/910,806 filed on Apr. 9, 2007, the contents of which are hereby incorporated by reference.

TECHNICAL FIELD

This application relates generally to aiming devices to display device for displaying vehicle state information.

BACKGROUND OF THE ART

Figure 1:
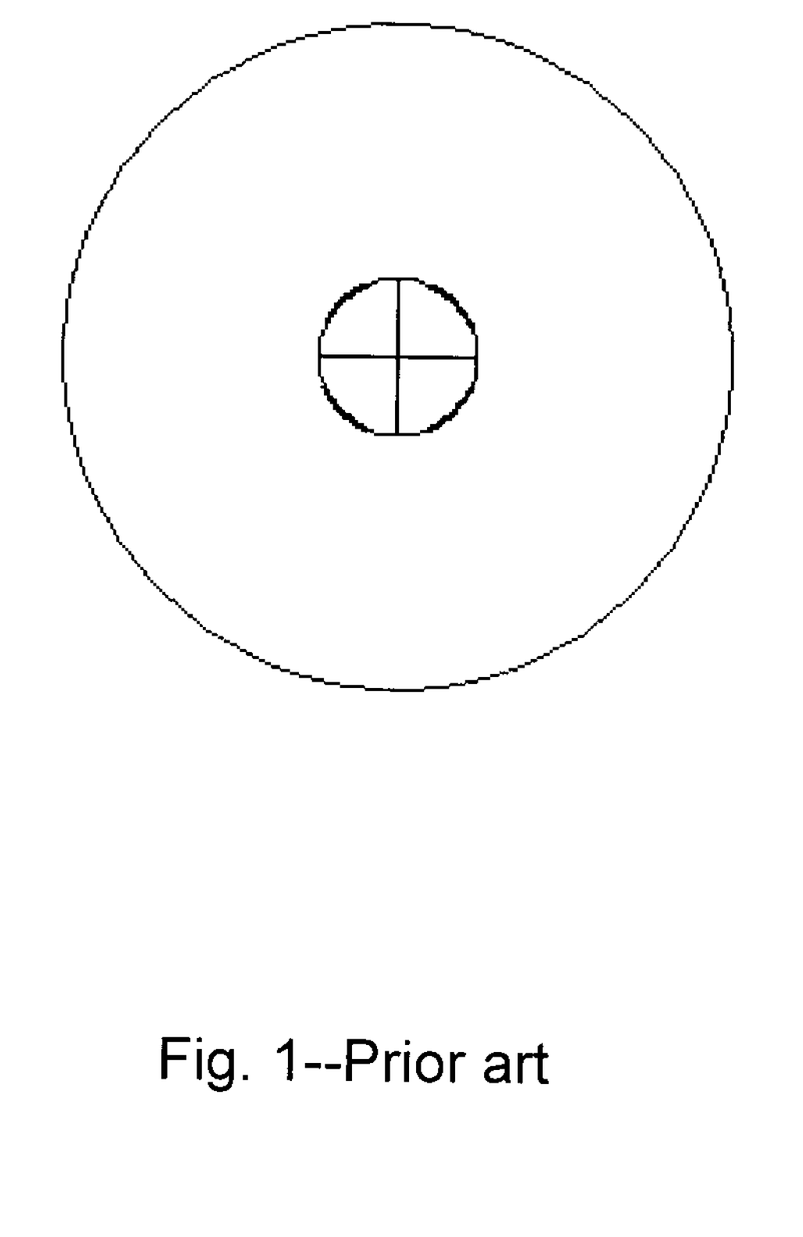
FIG. 1 is a schematic illustration of a simple example of the basic reticle symbology according to the prior art.

Typical sighting or targeting reticles generally comprise a circular sighting ring with a central cross-hair or "pipper" which marks the exact aiming-point or target at within the field of view of the sighting ring. FIG. 1 illustrates a simple example of the basic reticle symbology of the prior art.

Sighting reticles may be adequate for gun sighting or camera-aiming purposes, particularly when the associated device (e.g. the gun or the camera) maintains a fixed orientation with respect to an operator. The situation becomes more complex however, when the frame of reference is no longer fixed. This situation occurs for example with a turret-mounted device which incorporates two or more axes of rotational freedom compared to a position of the operator. The most complex level of abstraction arises when the operator is no longer located in an aiming vehicle, as is the case for example with Unmanned Aerial Vehicles (UAVs).

In controlling UAVs for example, the operator lacks all non-instrument cues regarding the orientation and flight path of the vehicle, which makes it extremely challenging for a sensor operator to remain oriented in space. When a target of interest (TOI) or a "threat" is identified on the camera image, it is extremely difficult for the operator to determine which direction the vehicle should be turned to intercept, photograph, or evade the "threat". Some systems use auto-stabilization and auto-tracking devices to diminish the adverse effects by maintaining a "lock" on the target using gimballing techniques. These techniques however add yet another level of abstraction outside the operator's control loop for the vehicle and its sighting system.

There is therefore a need to provide a sighting reticle which aids an operator in controlling the vehicle.

SUMMARY OF THE INVENTION

The present application therefore addresses issues associated with the prior art.

In accordance with one of multiple embodiments, there is described a method for providing a sighting reticle oriented to aim at a target from a vehicle within an environment of the target. The method comprises: providing a graphical image representing the environment as seen from the vehicle when aiming at the target; determining a state of the vehicle with respect to a spatial reference point; overlaying the sighting reticle onto the graphical image, the sighting reticle indicating the target on the graphical image with respect to the spatial reference point, the sighting reticle comprising a marking defining the spatial reference point; positioning the sighting reticle to orient the marking based on the state of the vehicle; and displaying on a display device the sighting reticle positioned on the graphical image to enable aiming at the target.

In accordance with another one of multiple embodiments, there is provided a system which provides a sighting reticle oriented to aim at a target from a vehicle within an environment of the target. The system comprises: a processing module; a database accessible by the processing module; an application coupled to the processing module; and a display unit. The application is configured for: receiving vehicle state information from the vehicle; receiving a graphical image, the graphical image representing the environment as seen from the vehicle when aiming at the target; determining a state of the vehicle with respect to a spatial reference point using the vehicle state information received; overlaying the sighting reticle onto the graphical image received, the sighting reticle indicating the target on the graphical image with respect to the spatial reference point, the sighting reticle comprising a marking defining the spatial reference point; and positioning the sighting reticle to orient the marking based on the state of the vehicle. The display unit is for displaying the sighting reticle positioned on the graphical image to enable aiming at the target.

Further details of these and other aspects of the present invention will be apparent from the detailed description and Figures included below.

BRIEF DESCRIPTION OF THE DRAWINGS

Reference is now made to the accompanying Figures depicting aspects of the present invention, in which.

DETAILED DESCRIPTION

The sighting reticle thus provided and displayed in accordance with the present description modifies the traditional reticle symbology by using vehicle information and spatial referencing.

Figure 2A:
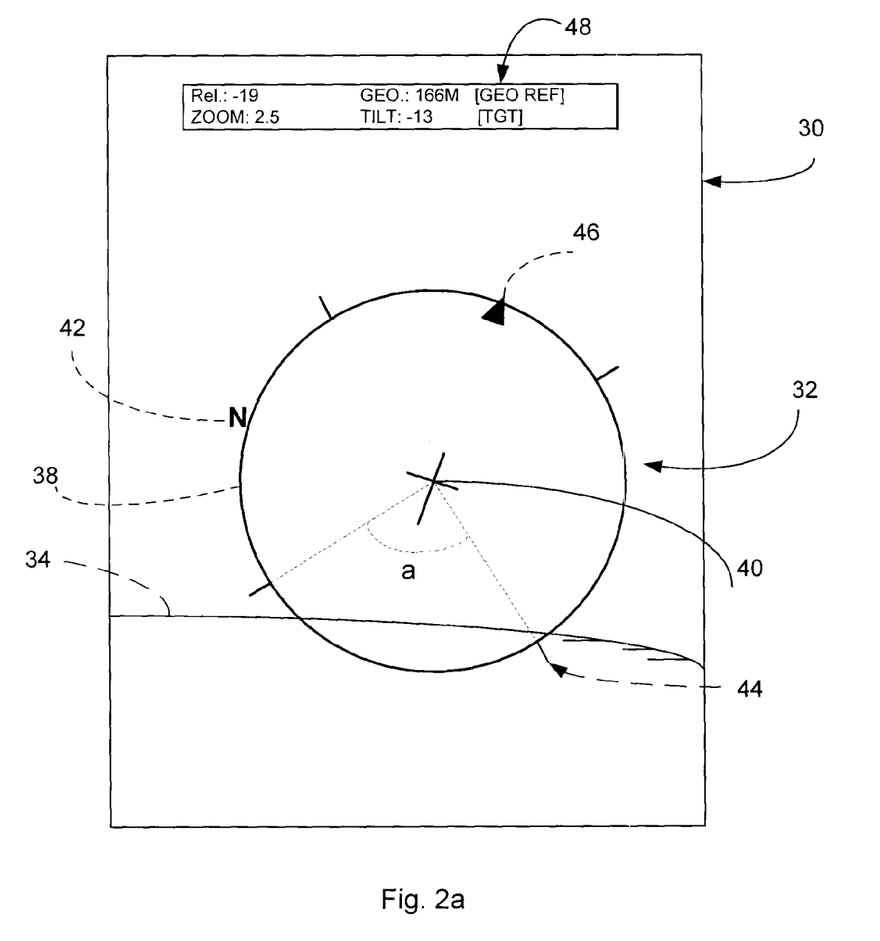
FIG. 2a is a schematic illustration of an oriented sighting reticle overlaid on an image with a horizon line in accordance with an embodiment.

Reference is made to FIG. 2a, which illustrates an exemplary display of an oriented reticle as per the method and system described hereinbelow. In FIG. 2a, there is shown a graphical image 30 having a sighting reticle 32 overlaid thereon. The graphical image 30 shows a horizon line 34 along with geographical features (not shown).

The sighting reticle 32 has a sighting ring 38 (also referred to as a sighting circle) and a central reference symbol 40 such as that defining central cross hairs for example, therein aimed at a target. Marking 42 on the sighting ring 38 represents a spatial reference point. Additional optional indices 44 (annotated or not) can be added to the sighting reticle 32 to add reference points. These can be spaced by varying angles "a" as desired around the sighting ring 38 and can form, with the spatial reference point at 42, a spatial reference frame for indicating a state of the vehicle. Other vehicle heading indices such as index 46 can be added to the sighting reticle to indicate a heading direction of the vehicle. In addition, the central reference symbol 40 can be adapted to represent a shape of the vehicle from which an orientation of the vehicle can be inferred. In addition to the above, vehicle state information 48 can be overlaid on the graphical image, as illustrated.

Figure 2B:
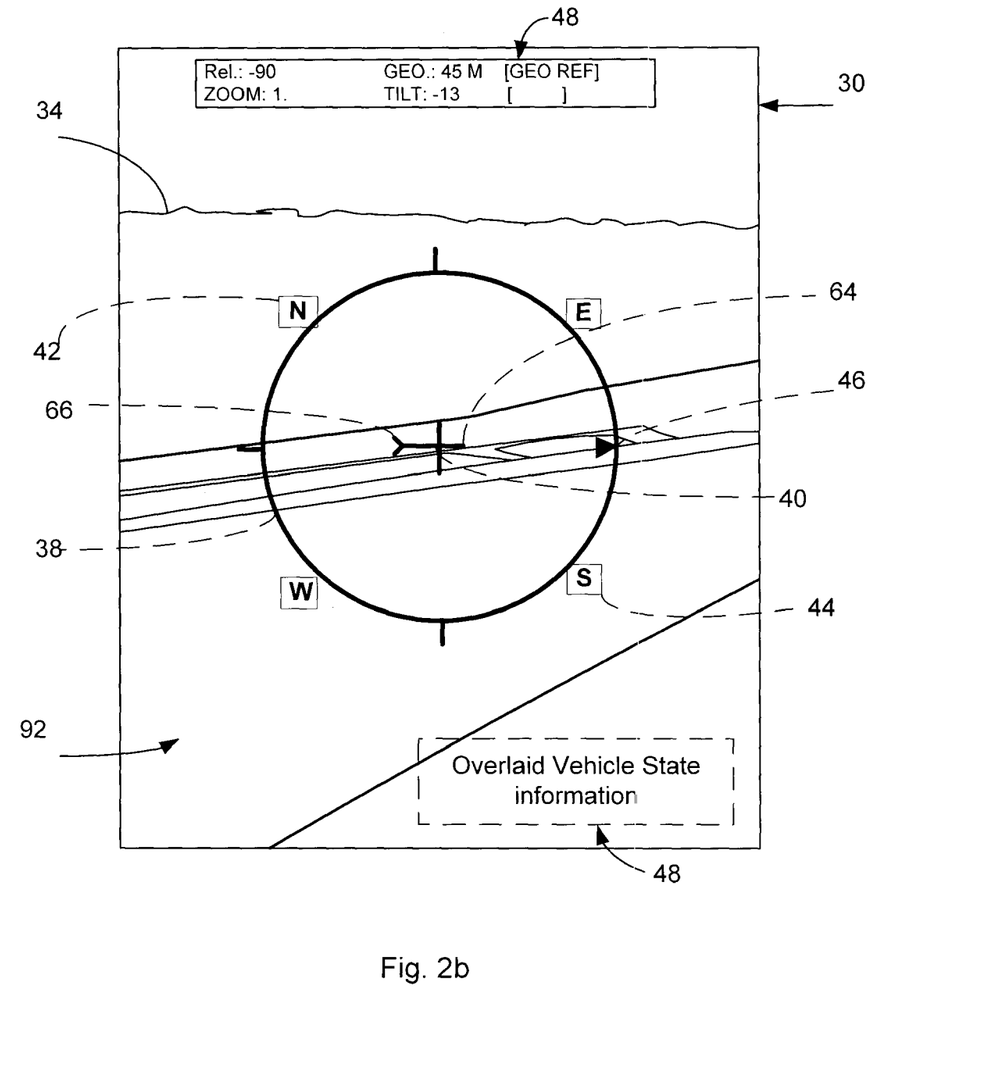
FIG. 2b is an exemplary display of an oriented reticle overlaid on an image with a runway.
Figure 2C:
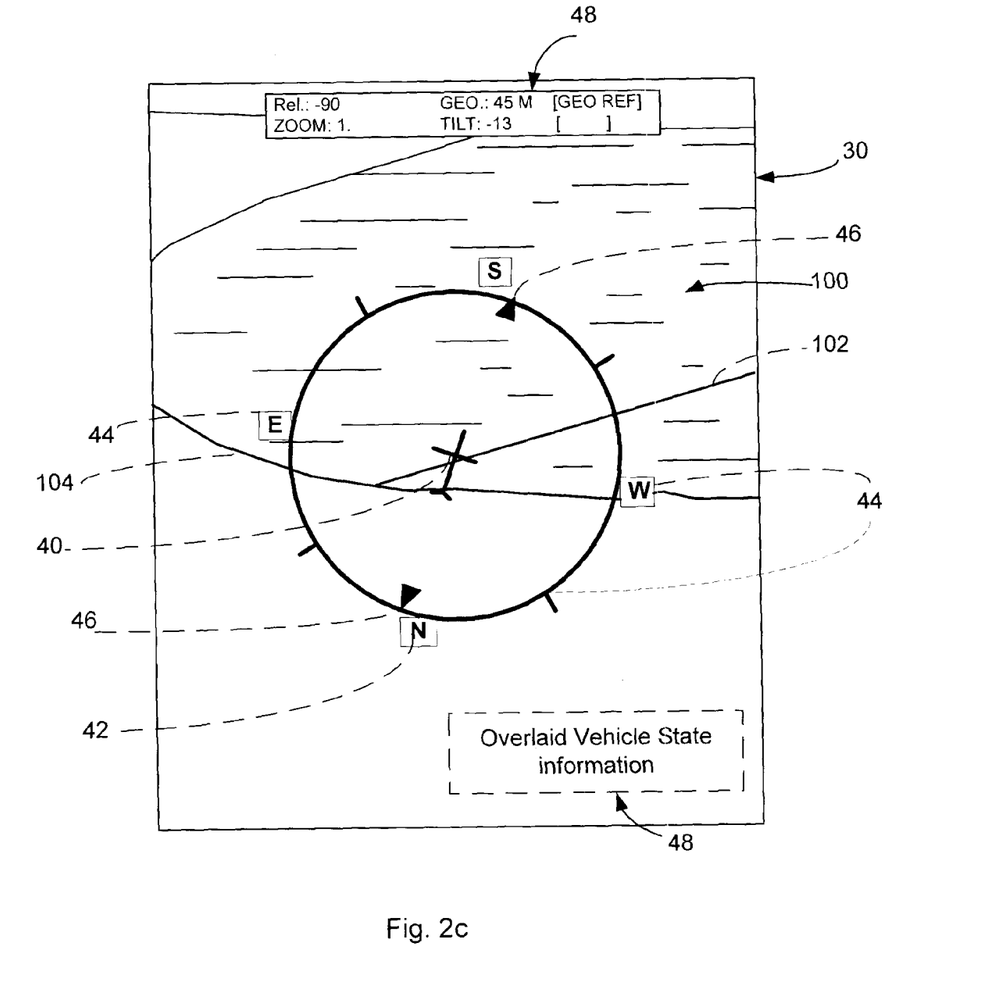
FIG. 2c is another exemplary display of an oriented reticle overlaid on an image with a body of water and a pier.

FIGS. 2b and 2c both provide examples based on electronic imagery obtained from a UAV aiming or sensor equipment (76 or 78) having a spatial reference point 42 defined as True North. The aiming equipment system in FIG. 2b is oriented in an approximately Northeasterly direction, as depicted by the top-centre of the sighting ring 38, close to the horizon line 34. In contrast, the vehicle 74 is heading in a Southeasterly direction as indicated by the vehicle heading orientation index 46, almost parallel to the runway 92. The target at central reference symbol 40 is shown to be at the intersection of the taxiway, on the other side of the runway 92, with the short cutoff leading to the runway 92.

In FIG. 2c, the target as seen by the aiming equipment 76 and the vehicle 74 are almost aligned. The vehicle 74 is heading slightly West of South, toward the far point of the bay 100, and the aiming equipment is aiming slightly East of south. The pier 102 runs Northeast-Southwest, and the target at central reference symbol 40 is directly on the pier 102, slightly off-shore from the beach 104.

Figure 3:
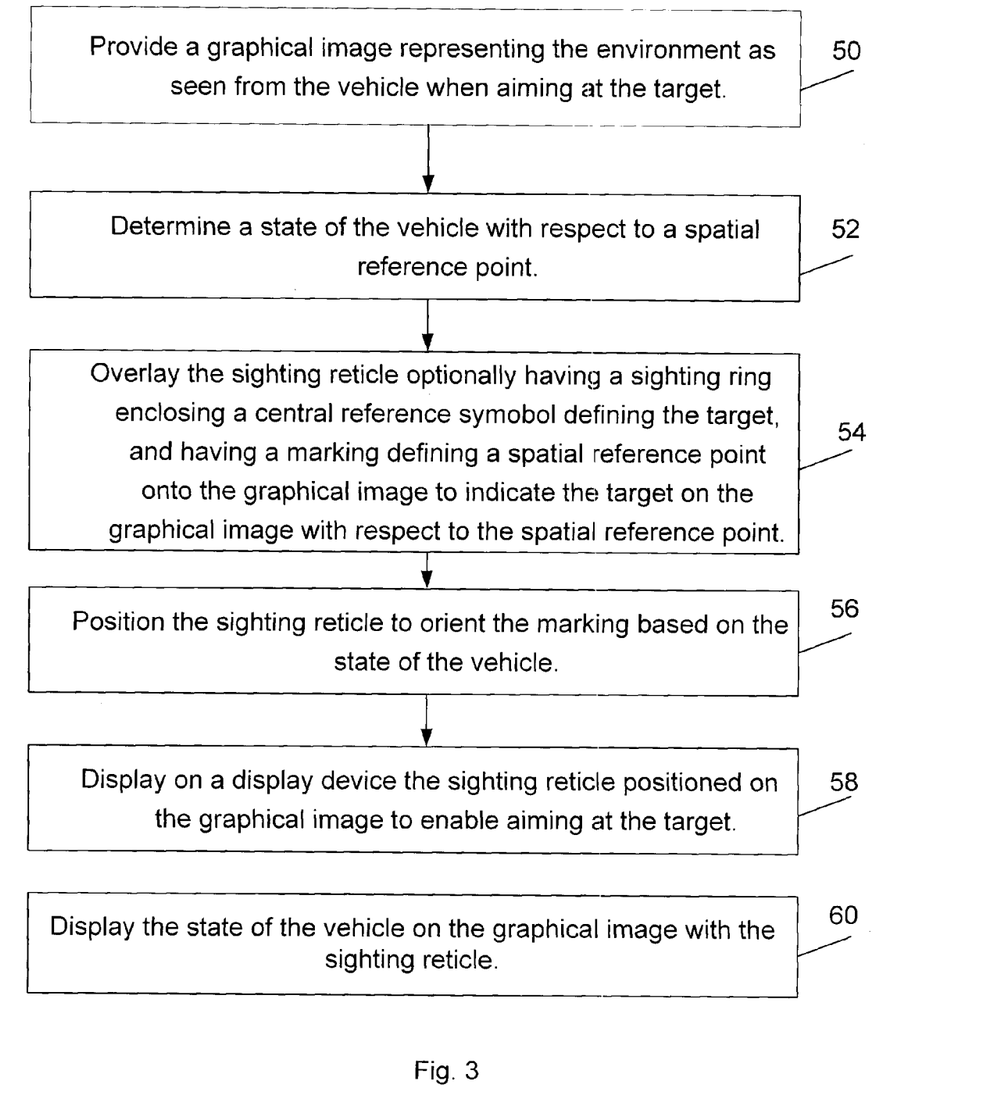
FIG. 3 is a flow chart of a method for providing an oriented sighting reticle for aiming at a target, in accordance with an embodiment.

Referring now to FIG. 3, there is described a method for providing a sighting reticle oriented to aim at a target. In step 50, a graphical image representing the environment as seen from the vehicle when aiming at the target is provided. At step 52, a state of the vehicle is determined. The state is relative to a spatial reference point. Step 54 involves overlaying the sighting reticle onto the graphical image. The sighting reticle indicates the target on the graphical image with respect to the spatial reference point and the sighting reticle comprises a marking defining the spatial reference point. At step 56, the sighting reticle is positioned to orient the marking based on the state of the vehicle. In step 58, a display device displays the sighting reticle positioned on the graphical image to enable aiming at the target. Step 60 is optional and involves the display of the state of the vehicle on the graphical image with the sighting reticle. Any display unit can be used to accomplish this display, as for step 58.

The graphical imagery includes, but is not limited to, photographic imagery from a camera, radar, infra-red, synthetic imagery, or vision systems where the graphical imagery is formed from graphical data derived from databases. Any type of sensor can be used to acquired the graphical imagery.

Although the above method applies to any type of vehicle, the examples provided herein are generally based on a UAV because this type of platform tends to pose more severe challenges to an operator than surface-based vehicles. Other possible types of vehicles are for example helicopters, tanks, cars or various aircraft.

If the vehicle is an aircraft, the vehicle state information may be received from the aircraft's primary instrumentation systems and may include such information as, but not limited to, aircraft altitude, heading direction, and ground track. This overlaid information is exemplified by FIGS. 2b and 2c.

In the present method, further steps can be optionally included to overlay annotated angular markings, such as cardinal bearing indices, on the aiming circle of the sighting reticle. The annotated angular markings are oriented to a selected reference point which can optionally be chosen to be a True, a Magnetic North, a Grid North or any other suitable Grid reference appropriate to the operation of the vehicle. These annotated indices may also be supplemented by additional indices, as desired. Such annotated indices can form together a fully annotated compass rose of 360 degrees although adequate orientation of the reticle can be achieved by the use of a single spatial reference point or a frame formed by the cardinal markings as shown in FIG. 2b or 2c.

The above method also optionally has additional vehicle state indices overlaid on the sighting circle of the sighting reticle. In FIGS. 2a and 2b, a single vehicle state index 46 is shown and aligned with the heading of the vehicle. These represent the vehicle's heading and/or track in reference to the spatial reference point of the annotated indices on the sighting ring. Two of these indices 46 are used in FIG. 2c.

The central reference symbol 40 is also optionally modified to form a plan-view vehicle representation typical of navigation displays that are well known to one versed in the art. Such adapted central reference symbol has a head 64 and a tail 66 indicative of an orientation of the vehicle in space, while still defining an aiming point or target of the sighting reticle 32.

For example, in reference now with FIGS. 2b and 2c, the central reference symbol 40 is adapted to represent an aircraft by having the symbolic "wings" intersected by a "fuselage" at a centre of rotation of the symbol so as to simultaneously represent the target or aiming point. A symbolic "tail" 66 is also added to the reference symbol to assist in determining its orientation. The central reference symbol is rotatable and oriented in accordance with the vehicle state indices 46 or the vehicle state information. Accordingly, the operator can immediately gauge the direction of the vehicle's heading orientation (or track) in relation to the graphical imagery 30 and spatial reference point 42 for example.

Figure 4:
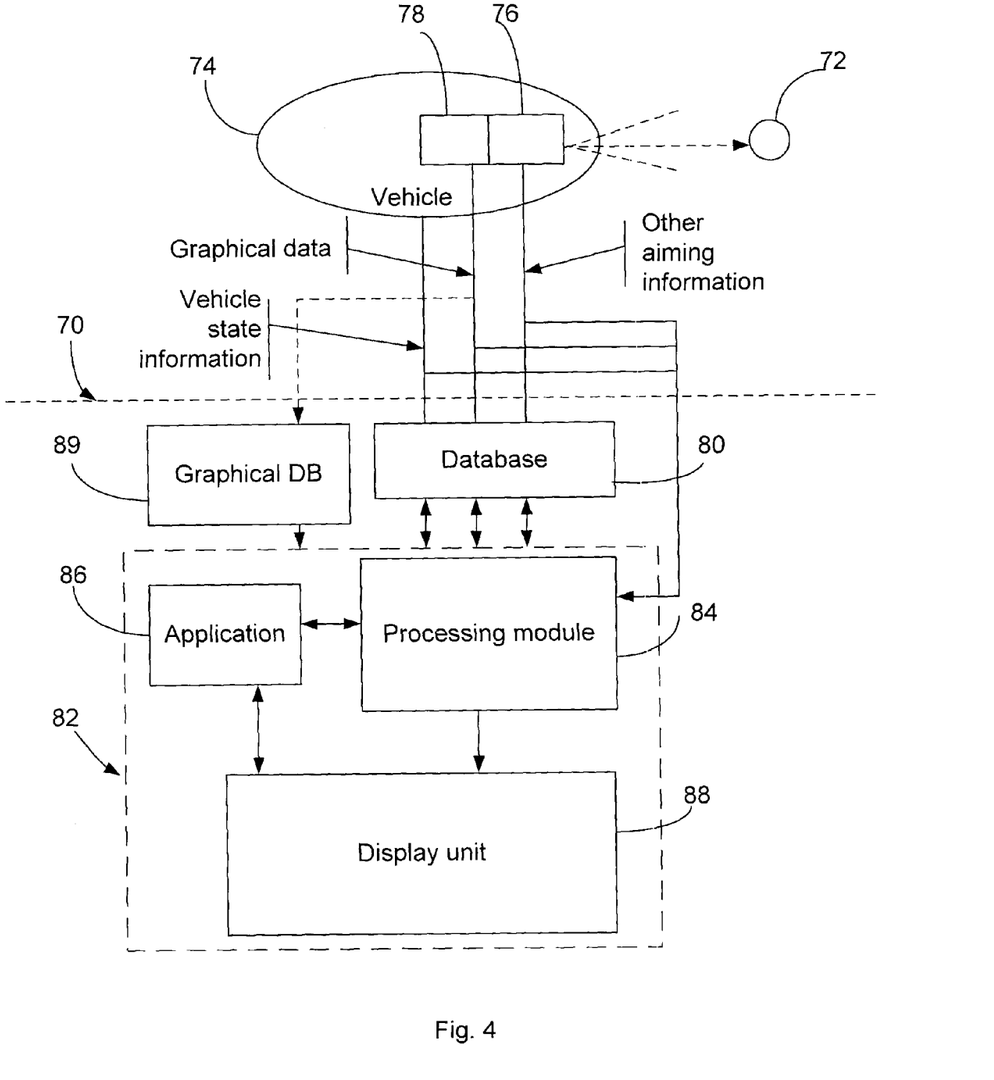
FIG. 4 is a schematic illustration of a system for aiming at a target, in accordance with an embodiment.

Now referring to FIG. 4, there is illustrated a system 70 for aiming at a target 72 from the vehicle 74 by implementing an embodiment of the above described method. The vehicle 74 has aiming equipment 76 which optionally has a sensor 78 recording graphical data for representing the environment of the vehicle 74 when aiming at the target 72.

The system 70 receives information from the vehicle 74, including vehicle state information, graphical data and other optional aiming information from the aiming equipment 76.

The system 70 has a database 80 for recording information received from the vehicle 74. This information is retrieved and processed for display by a sighting module 82. In one embodiment, the database 80 can integrally form part of the sighting module 82.

The sighting module 82 has a processing module 84, an application 86 and a display unit 88. The processing module 84 has access to the database 80 and the application 86.

The system 70 optionally has a graphical database 89 which is dedicated to storing graphical data either as received from the sensor 78 or as compiled beforehand to provide synthetic imaging. Databases 80 and 89 may also be provided as a single database. The system 70 can also have an input device (not shown) allowing an operator to set various customization parameters of the system such as the setting of the spatial reference point or different display options which are then used to update any default parameters stored on database 80.

An optional user interface (not shown) can also form part of the system 70, along with other input/output devices (not shown) allowing various forms of transmission and reception of information between the operator and the system 70. These input/output devices include but are not limited to, mouse, joysticks, keyboard, touch screen, speaker, microphone and the like.

The processing module 84 accesses the application 86 and the database 80 or 89 to retrieve vehicle state information as received from the vehicle 74. In addition, graphical data is retrieved from either the database 89 or the sensor 78. Such graphical data is used to display on the display unit 88 a graphical image representing the environment as seen from the vehicle 74 when aiming at the target 72.

The processing module 84 processes the vehicle state information to determine a state of the vehicle 74 with respect to a given spatial reference point. This state can include information such as a position, an orientation, heading or ground track information of the vehicle with respect to the spatial reference point.

The processing module 84 overlays a sighting reticle for display on the graphical image to indicate where the target 72 is on the graphical image. The sighting reticle also has a marking placed so as to show the spatial reference point. The processing module 84 thus positions and orients the sighting reticle with its marking over the graphical image to enable a display indicating both the location of the target with respect to the vehicle and in turn the state of the vehicle with respect to the spatial reference point.

The graphical image and properly overlaid and positioned sighting reticle is then sent to the display unit 88 for display to enable an operator or control equipment to aim the aiming equipment 76 at the target.

The processing module 84 of the system 70 can implement the above optional actions described herein in relation to the method of FIG. 3 and displays on the display unit 88 the sighting reticle in accordance with these options. The system 70 enables a control of the vehicle 74 and the aiming equipment 76 on the vehicle 74 by outputting the sighting reticle positioned on the graphical image. This output allows an aiming of the aiming equipment 76 at the target 72.

The above description is meant to be exemplary only, and one skilled in the art will recognize that changes may be made to the embodiments described without department from the scope of the invention disclosed. Still other modifications which fall within the scope of the present invention will be apparent to those skilled in the art, in light of a review of this disclosure, and such modifications are intended to fall within the appended claims.

What is claimed is:

1. A method for providing a sighting reticle oriented to aim at a target from a vehicle within an environment of the target, the method comprising:
   providing a graphical image representing the environment seen from the vehicle when aiming at the target;
   determining a state of the vehicle with respect to a spatial reference point;
   overlaying the sighting reticle onto the graphical image, the sighting reticle indicating the target on the graphical image with respect to the spatial reference point, the sighting reticle comprising a marking defining the spatial reference point;
   positioning the sighting reticle to orient the marking based on the state of the vehicle; and
   displaying on a display device the sighting reticle positioned on the graphical image to enable aiming at the target.

2. The method of claim 1, wherein the determining a state of the vehicle comprises determining an orientation of the vehicle with respect to the spatial reference point.

3. The method of claim 1, further comprising displaying the state of the vehicle on the graphical image.

4. The method of claim 3, wherein the displaying the state of the vehicle on the graphical image comprises displaying a central reference symbol to represent the orientation of the vehicle.

5. The method of claim 1, wherein the overlaying the sighting reticle onto the graphical image comprises overlaying annotated indices on the sighting reticle, the annotated indices defining a spatial reference frame relative to the spatial reference point.

6. The method of claim 5, wherein the spatial reference point is one of True North, Magnetic North or Grid North and wherein the annotated indices each indicate a geographical reference direction.

7. The method of claim 5, wherein the overlaying the annotated indices on the sighting reticle comprises spacing the annotated indices apart on the sighting reticle at angles of at most about ninety degrees.

8. The method of claim 1, wherein the overlaying the sighting reticle comprises overlaying a sighting ring enclosing a central reference symbol defining the target.

9. The method of claim 8, further comprising orienting the central reference symbol in relation to the marking on the sighting ring to illustrate a travel orientation of the vehicle with respect to the spatial reference point and the target.

10. The method of claim 1, wherein the providing the graphical image comprises acquiring the graphical image using a sensor aimed at the target.

11. The system of claim 10, further comprising aiming equipment from which the graphical image is received, the aiming equipment being located on the vehicle.

12. A system for providing a sighting reticle oriented to aim at a target from a vehicle within an environment of the target, the system comprising:
   a processing module;
   a database accessible by the processing module;
   an application coupled to the processing module, the application configured for:
      receiving vehicle state information from the vehicle;
      receiving a graphical image, the graphical image representing the environment seen from the vehicle when aiming at the target;
      determining a state of the vehicle with respect to a spatial reference point using the vehicle state information received;
      overlaying the sighting reticle onto the graphical image received, the sighting reticle indicating the target on the graphical image with respect to the spatial reference point, the sighting reticle comprising a marking defining the spatial reference point; and
      positioning the sighting reticle to orient the marking based on the state of the vehicle; and
   a display unit for displaying the sighting reticle positioned on the graphical image to enable aiming at the target.

13. The system of claim 12, wherein the application is configured for determining an orientation of the vehicle with respect to the spatial reference point.

14. The system of claim 13, wherein the display unit displays the state of the vehicle on the graphical image.

15. The system of claim 13, wherein the application is configured for allowing the display unit to display a central reference symbol to represent the orientation of the vehicle.

16. The system of claim 12, wherein the marking comprises annotated indices, the annotated indices defining a spatial reference frame relative to the spatial reference point.

17. The system of claim 16, wherein the reference point is one of True North, Magnetic North or Grid North and wherein the annotated indices each indicate a geographical reference direction with respect to the reference point.

18. The system of claim 16, wherein the annotated indices on the sighting reticle are spaced apart by angles of at most about ninety degrees.

19. The system of claim 12, wherein the sighting reticle comprises a central reference symbol enclosed by a sighting ring, the central reference symbol locating the target, the marking being on the sighting ring.

20. The system of claim 19, wherein the application is configured for orienting the central reference symbol in relation to the marking on the sighting ring to illustrate a travel orientation of the vehicle with respect to the reference point and the target.

21. The system of claim 12, further comprising another database for storing graphical data representing the graphical image.

* * * * *